United States Patent
Wu

(10) Patent No.: US 12,550,455 B2
(45) Date of Patent: Feb. 10, 2026

(54) ESD PROTECTION CIRCUIT HAVING DIFFERENT DISCHARGING PATHS

(71) Applicant: Realtek Semiconductor Corp., HsinChu (TW)

(72) Inventor: Chien-Ming Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 946 days.

(21) Appl. No.: 17/728,962

(22) Filed: Apr. 25, 2022

(65) Prior Publication Data

US 2022/0415875 A1  Dec. 29, 2022

(30) Foreign Application Priority Data

Jun. 28, 2021  (TW) .................................. 110123551

(51) Int. Cl.
*H10D 89/60* (2025.01)
*H10D 84/80* (2025.01)

(52) U.S. Cl.
CPC ......... *H10D 89/813* (2025.01); *H10D 84/811* (2025.01)

(58) Field of Classification Search
CPC .. H10D 89/813; H10D 84/811; H10D 89/819; H02H 9/046
See application file for complete search history.

(56) References Cited

U.S. PATENT DOCUMENTS

| | | | | |
|---|---|---|---|---|
| 8,514,532 B2* | 8/2013 | Worley | .................. | H02H 9/046 361/111 |
| 10,109,998 B2* | 10/2018 | Altaras | ..................... | H02H 9/04 |
| 10,734,806 B2* | 8/2020 | Zhao | ...................... | H02H 9/046 |
| 10,931,101 B2* | 2/2021 | Wu | ......................... | H02H 3/207 |
| 2015/0043113 A1* | 2/2015 | Yang | ...................... | H02H 9/046 361/56 |
| 2017/0155243 A1* | 6/2017 | Tan | ......................... | H02H 9/046 |
| 2017/0221879 A1* | 8/2017 | Wang | .................... | H10D 89/819 |
| 2018/0024187 A1* | 1/2018 | Tatsumi | ............. | G01R 31/2853 361/118 |
| 2018/0212422 A1* | 7/2018 | Wu | .......................... | H02H 9/04 |
| 2022/0344930 A1* | 10/2022 | Sun | ......................... | H02H 9/046 |

* cited by examiner

Primary Examiner — Caleb E Henry
(74) Attorney, Agent, or Firm — Winston Hsu

(57) ABSTRACT

The present invention provides an ESD protection circuit including a control circuit, a first transistor, a filter and a second transistor. The control circuit is configured to detect a level of a supply voltage to generate a control signal. The first transistor is coupled between the supply voltage and a ground voltage, and is used to refer to the control signal to determine whether to be enabled as a discharging path for the supply voltage to discharge current to the ground voltage. The filter is configured to filter the control signal to generate a filtered control signal. The second transistor is coupled between the supply voltage and the ground voltage, and is used to refer to the filtered control signal to determine whether to be enabled as a discharging path for the supply voltage to discharge current to the ground voltage.

10 Claims, 4 Drawing Sheets

ESD PROTECTION CIRCUIT HAVING DIFFERENT DISCHARGING PATHS

BACKGROUND OF THE INVENTION

1. Field of the Invention

The present invention relates to an electrostatic discharge (ESD) protection circuit.

2. Description of the Prior Art

In a conventional ESD protection circuit, in order to discharge a large current, an ESD clamping transistor is generally designed to be large to effectively protect the internal circuits. However, if the ESD protection circuit encounters a surge current with a small energy but a fast speed, the large-size clamping transistor will cause the supply voltage to fluctuate too much due to excessive discharge energy and the inductance effect of the chip package, which will cause the internal circuit to fail to transmit healthy signals.

SUMMARY OF THE INVENTION

It is therefore an objective of the present invention to provide an ESD protection circuit, which can have different discharging paths for surge currents with different speeds and energies, so as to solve the problem of supply voltage fluctuations in the prior art.

In one embodiment of the present invention, an ESD protection circuit comprising a control circuit, a first transistor, a filter and a second transistor is disclosed. The control circuit is configured to detect a level of a supply voltage to generate a control signal. The first transistor is coupled between the supply voltage and a ground voltage, and is used to refer to the control signal to determine whether to be enabled as a discharging path for the supply voltage to discharge current to the ground voltage. The filter is configured to filter the control signal to generate a filtered control signal. The second transistor is coupled between the supply voltage and the ground voltage, and is used to refer to the filtered control signal to determine whether to be enabled as a discharging path for the supply voltage to discharge current to the ground voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
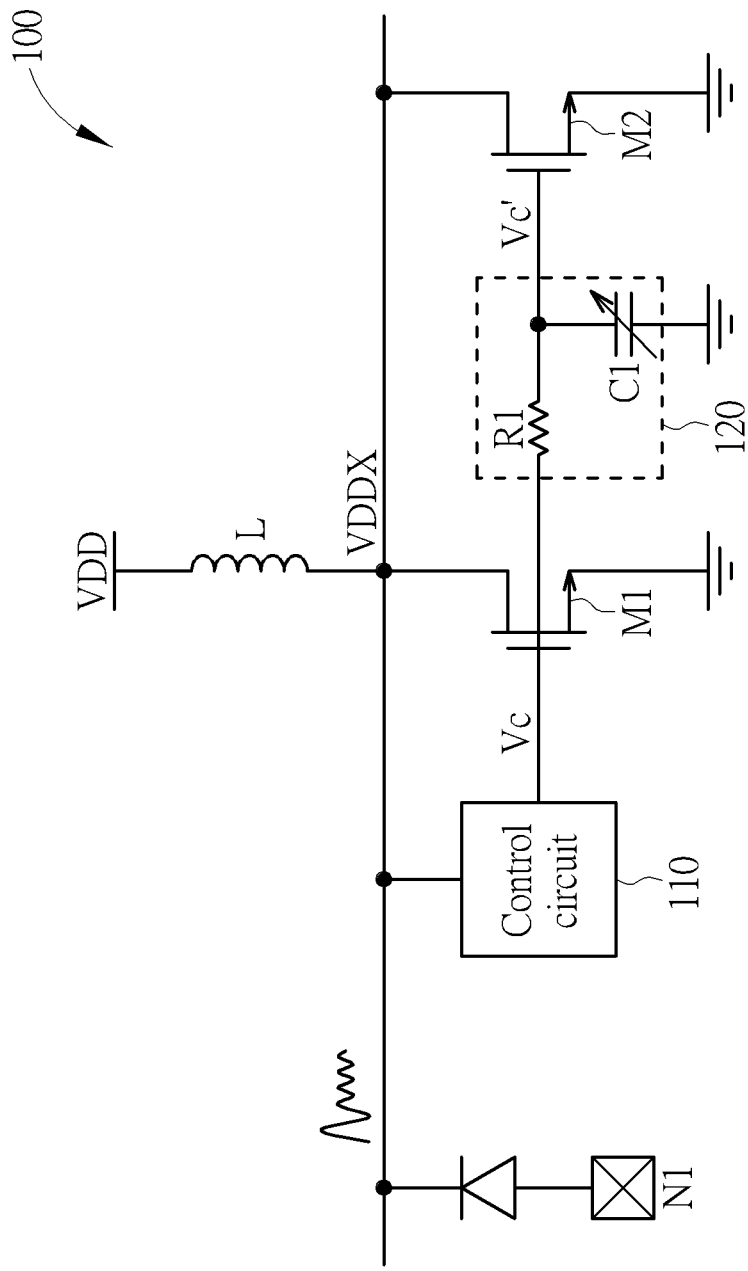
FIG. 1 is a diagram illustrating an ESD protection circuit according to one embodiment of the present invention.

FIG. 1 is a diagram illustrating an ESD protection circuit 100 according to one embodiment of the present invention. As shown in FIG. 1, the ESD protection circuit 100 comprises a pad N1, a control circuit 110, a filter 120 and two transistors M1 and M2, wherein the filter 120 comprises a resistor R1 and a capacitor C1. In this embodiment, the ESD protection circuit 100 is positioned within a chip such as an Ethernet chip or any other chip that needs electrostatic discharge protection, where the pad N1 is a signal input/output node of the chip, and the supply voltage VDDX of the chip is generated by an external supply voltage VDD.

Figure 2:
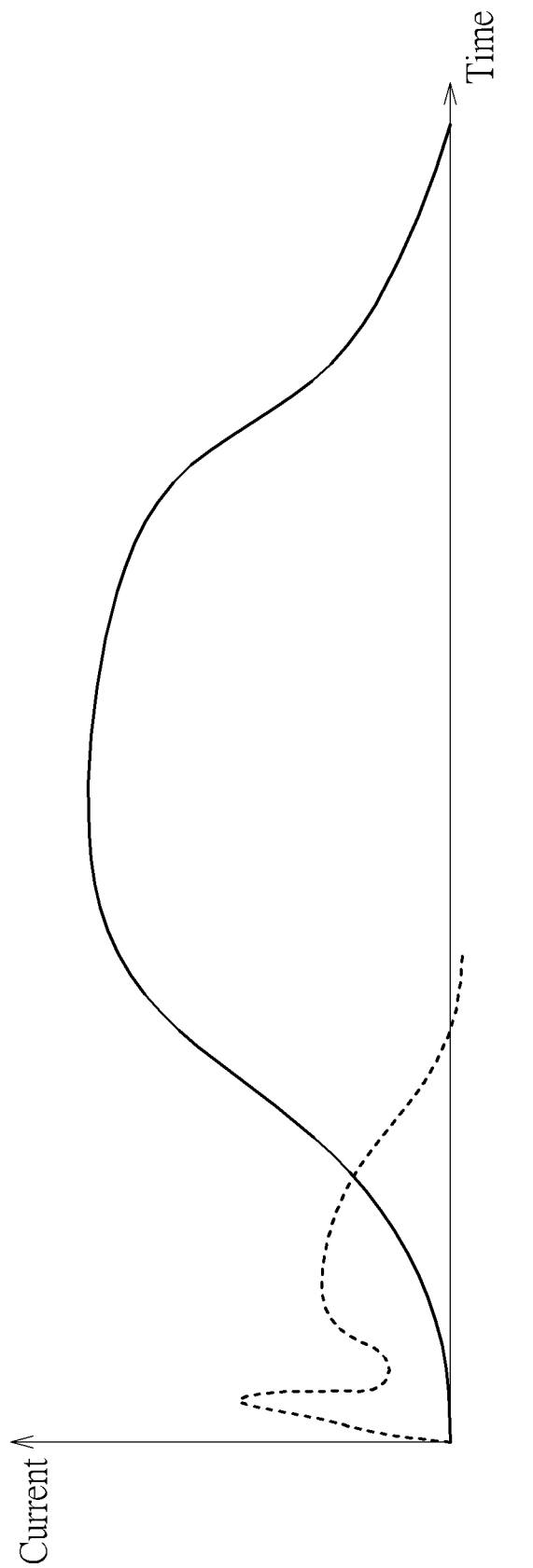
FIG. 2 shows a surge current with a smaller energy but a faster speed and a surge current with a larger energy but a slower speed.

In this embodiment, since the supply voltage VDDX in the chip is generated according to the external supply voltage VDD, and the windings outside the chip have parasitic inductance ("L" in FIG. 1), so if a surge current flows into the chip through the pad N1 to trigger the electrostatic discharge protection mechanism, the supply voltage VDDX will be fluctuated due to the parasitic inductance L. In addition, the surge currents have different speeds and energy due to different sources, for example, the dotted line shown in FIG. 2 is a surge current with smaller energy but faster speed, and a solid line shown in FIG. 2 is a surge current with larger energy but slower speed. In terms of ESD protection, considering the surge current with larger energy, it is necessary to design a larger size transistor to quickly discharge its current; however, if the surge current with small energy but fast speed passes through the larger size transistor, the supply voltage VDDX will have a large fluctuation due to the effect of the parasitic inductance L. Therefore, in order to solve this problem, the ESD protection circuit 100 shown in FIG. 1 is designed with two discharging paths to discharge the above two different surge currents, so as to effectively solve the problem of the voltage fluctuation of the supply voltage VDDX.

Specifically, referring to FIG. 1, the control circuit 110 is configured to detect a level of the supply voltage VDDX to determine if a surge current flows into the chip to generate a control signal Vc. A drain electrode of the transistor M1 is connected to the supply voltage VDDX, a source electrode of the transistor M1 is connected to the ground voltage, and a gate electrode of the transistor M1 is used to receive the control signal Vc to determine if being enabled to discharge the surge current to lower the voltage level of the supply voltage VDDX. The filter 120 is a low-pass filter, which is used to filter the control signal Vc to generate a filtered control signal Vc'. A drain electrode of the transistor M2 is connected to the supply voltage VDDX, a source electrode of the transistor M2 is connected to the ground voltage, and a gate electrode of the transistor M2 is used to receive the filtered control signal Vc' to determine if being enabled to discharge the surge current to lower the voltage level of the supply voltage VDDX.

In this embodiment, the transistor M1 is used to discharge a surge current with small energy but fast speed, therefore, in order to avoid the voltage fluctuation of the supply voltage VDDX caused by the excessive current of the transistor M1, the transistor M1 will have smaller size, that is, the transistor M1 has a smaller allowable maximum current. In addition, the transistor M2 is used to discharge a surge current with large energy but slow speed, therefore, in order to effectively discharge the large surge current, the transistor M2 will have larger size, that is, the transistor M2 has a greater allowable maximum current. In addition, due to the design of the filter 120, when a surge current with a small energy but a fast speed occurs, the transistor M2 will not be enabled, so the problem of the voltage fluctuation of supply voltage VDDX caused by the enablement of the transistor M2 due to the surge current with low energy and fast speed can be avoided.

In one embodiment, the filter 120 has an adjustable cutoff frequency for adjustment during a test phase to ensure that the transistor M2 will not be enabled due to the surge current with low energy and fast speed. For example, the capacitor C1 can be a variable capacitor for adjustment to an appropriate capacitance.

Figure 3:
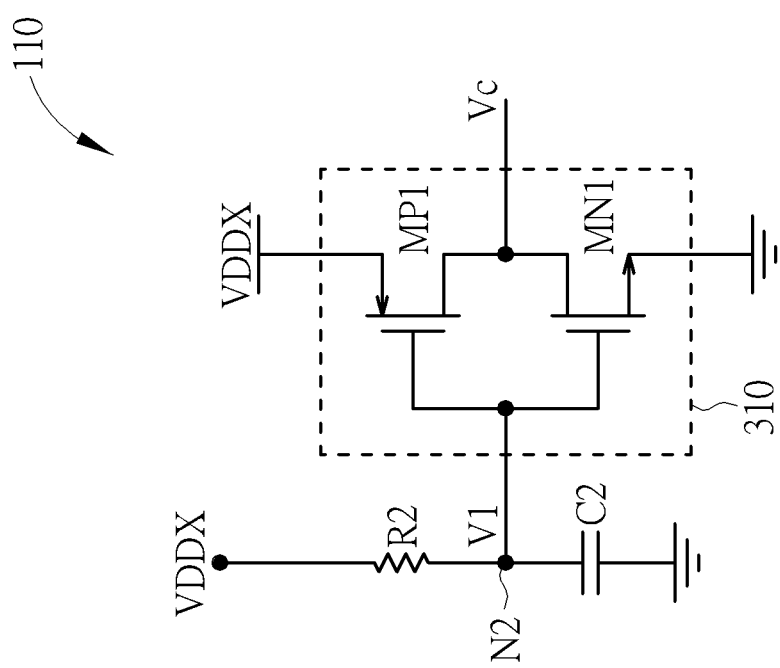
FIG. 3 is a diagram illustrating a control circuit according to one embodiment of the present invention.

FIG. 3 is a diagram illustrating the control circuit 110 according to one embodiment of the present invention. As shown in FIG. 3, the control circuit 110 comprises a resistor R2, a capacitor C2 and an inverter 310, wherein the inverter 310 comprises a P-type transistor MP1 and an N-type transistor MN1. One terminal of the resistor R2 is connected to the supply voltage VDDX, and another terminal of the resistor R2 is connected to a node N2. One terminal of the capacitor C2 is connected to the node N2, and another terminal of the capacitor C2 is coupled to the ground voltage. A source electrode of the P-type transistor MP1 is connected to the supply voltage VDDX serving as the supply voltage of the inverter 310, a drain electrode of the P-type transistor MP1 is connected to an output terminal to generate the control signal Vc, and a gate electrode of the P-type transistor MP1 is connected to the node N2. A source electrode of the N-type transistor MN1 is connected to the ground voltage, a drain electrode of the N-type transistor MN1 is connected to the output terminal to generate the control signal Vc, and a gate electrode of the N-type transistor MN1 is connected to the node N2. In the embodiment shown in FIG. 3, when the supply voltage VDDX rises due to the surge current flowing into the chip, the voltage level of the source electrode of the P-type transistor MP1 connected to the supply voltage VDDX also rises. Furthermore, the voltage V1 on the node N2 has a slower response speed due to the resistor R2 and the capacitor C2 (that is, the voltage V1 will not be boosted immediately due to the increase of the supply voltage VDDX), so the P-type transistor MP1 will be enabled immediately to make the control signal Vc have a high voltage level to enable the transistor M1 shown in FIG. 1.

It should be noted that the circuit structure shown in FIG. 3 is only an example, not a limitation of the present invention. As long as the control circuit 110 can effectively generate the control signal Vc to enable the transistor M1 when the level of the supply voltage VDDX rises. for example, a high-voltage control signal Vc is generated when the supply voltage VDDX is higher than a threshold value, the control circuit 110 may have different circuit designs.

As described above, by designing the transistors M1 and M2 to discharge different types of surge currents, respectively, the ESD protection circuit can effectively protect the internal circuit while avoiding the voltage fluctuation problem of the supply voltage VDDX.

Figure 4:
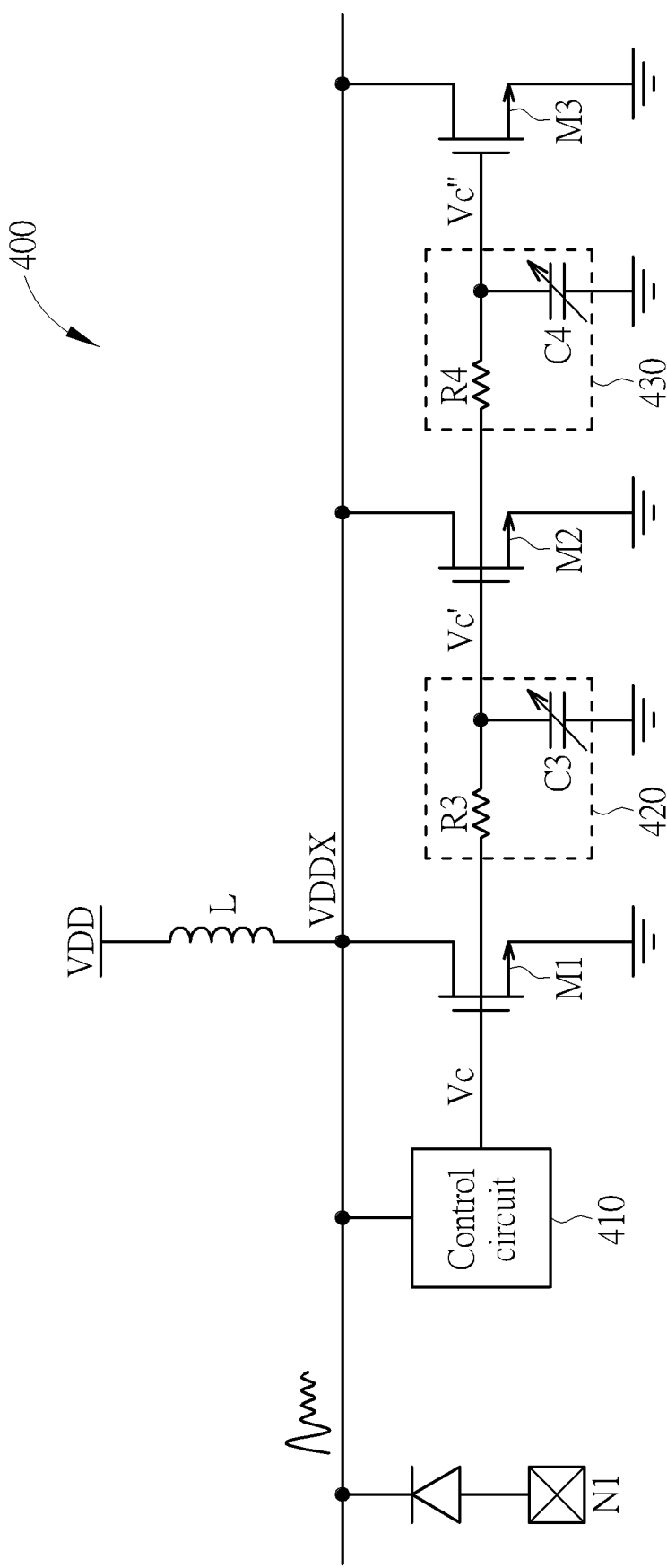
FIG. 4 is a diagram illustrating an ESD protection circuit according to another embodiment of the present invention.

In the embodiment shown in FIG. 1, two transistors M1 and M2 are taken as an example; however, the present invention can also be applied to the case of multiple transistors (i.e., multiple discharging paths). Specifically, FIG. 4 is a diagram illustrating an ESD protection circuit 400 according to one embodiment of the present invention. As shown in FIG. 4, the ESD protection circuit 400 comprises a pad N1, a control circuit 410, two filters 420 and 430, and three transistors M1, M2 and M3, wherein the filter 420 comprises a resistor R3 and a capacitor C3, and the filter 430 comprises a resistor R4 and a capacitor C4. In this embodiment, the ESD protection circuit 400 is positioned within a chip such as an Ethernet chip or any other chip that needs electrostatic discharge protection, where the pad N1 is a signal input/output node of the chip, and the supply voltage VDDX of the chip is generated by an external supply voltage VDD.

Referring to FIG. 4, the control circuit 410 is configured to detect a level of the supply voltage VDDX to determine if a surge current flows into the chip to generate a control signal Vc. A drain electrode of the transistor M1 is connected to the supply voltage VDDX, a source electrode of the transistor M1 is connected to the ground voltage, and a gate electrode of the transistor M1 is used to receive the control signal Vc to determine if being enabled to discharge the surge current to lower the voltage level of the supply voltage VDDX. The filter 420 is a low-pass filter, which is used to filter the control signal Vc to generate a filtered control signal Vc'. A drain electrode of the transistor M2 is connected to the supply voltage VDDX, a source electrode of the transistor M2 is connected to the ground voltage, and a gate electrode of the transistor M2 is used to receive the filtered control signal Vc' to determine if being enabled to discharge the surge current to lower the voltage level of the supply voltage VDDX. The filter 430 is a low-pass filter, which is used to filter the filtered control signal Vc' to generate a filtered control signal Vc". A drain electrode of the transistor M3 is connected to the supply voltage VDDX, a source electrode of the transistor M3 is connected to the ground voltage, and a gate electrode of the transistor M3 is used to receive the filtered control signal Vc" to determine if being enabled to discharge the surge current to lower the voltage level of the supply voltage VDDX.

In this embodiment, a size of the transistor M1 is smaller than a size of the transistor M2, that is the allowable maximum current of the transistor M1 is less than the allowable maximum current of the transistor M2. In addition, the size of the transistor M2 is smaller than a size of the transistor M3, that is the allowable maximum current of the transistor M2 is less than the allowable maximum current of the transistor M3. In other words, the transistor M1 is mainly used to discharge the surge current with small energy but fast speed, the transistor M2 is mainly used to discharge the surge current with medium energy and the medium speed, and the transistor M3 is mainly used to discharge the surge current with large energy but the slow speed. In addition, due to the design of the filter 420, when a surge current with a small energy but a fast speed occurs, the transistors M2 and M3 will not be enabled, so the problem of the voltage fluctuation of supply voltage VDDX caused by the enablement of the transistors M2 and M3 due to the surge current with low energy and fast speed can be avoided.

In one embodiment, each of the filters 420 and 430 has an adjustable cutoff frequency for adjustment during a test phase to ensure that the transistor M2/M3 will not be enabled due to the surge current with low energy and fast speed. For example, each of the capacitors C3 and C4 can be a variable capacitor for adjustment to an appropriate capacitance.

In one embodiment, the control circuit 410 can be implemented by using the circuit structure shown in FIG. 3, but the present invention is not limited to this. As long as the control circuit 410 can effectively generate the control signal Vc to enable the transistor M1 when the supply voltage VDDX level rises, the control circuit 410 can have different circuit designs.

Briefly summarized, in the ESD protection circuit of the present invention,
by using two or more transistors to respectively discharge different types of surge currents, and designing filters to prevent larger-sized transistor(s) from being enabled due to the surge current with low energy and fast speed, the ESD protection circuit can effectively protect the internal circuit while avoiding the voltage fluctuation problem of the supply voltage VDDX.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrostatic discharge (ESD) protection circuit, comprising:
    a control circuit, configured to detect a level of a supply voltage to generate a control signal;
    a first transistor, coupled between the supply voltage and a ground voltage, configured to refer to the control signal to determine whether to be enabled as a first discharging path for the supply voltage to discharge current to the ground voltage;
    a first filter, configured to filter the control signal to generate a first filtered control signal; and
    a second transistor, coupled between the supply voltage and the ground voltage, configured to refer to the first filtered control signal to determine whether to be enabled as a second discharging path for the supply voltage to discharge current to the ground voltage.

2. The ESD protection circuit of claim 1, wherein a size of the second transistor is greater than a size of the first transistor.

3. The ESD protection circuit of claim 1, wherein an allowable maximum current of the second transistor is greater than an allowable maximum current of the first transistor.

4. The ESD protection circuit of claim 1, wherein the first filter is a low-pass filter with adjustable cutoff frequency.

5. The ESD protection circuit of claim 1, further comprising:
    a second filter, configured to filter the first filtered control signal to generate a second filtered control signal; and
    a third transistor, coupled between the supply voltage and the ground voltage, configured to refer to the first filtered control signal to determine whether to be enabled as a third discharging path for the supply voltage to discharge current to the ground voltage.

6. The ESD protection circuit of claim 5, wherein a size of the second transistor is greater than a size of the first transistor, and a size of the third transistor is greater than the size of the second transistor.

7. The ESD protection circuit of claim 5, wherein an allowable maximum current of the second transistor is greater than an allowable maximum current of the first transistor, and an allowable maximum current of the third transistor is greater than the allowable maximum current of the second transistor.

8. The ESD protection circuit of claim 5, wherein each of the first filter and the second filter is a low-pass filter with adjustable cutoff frequency.

9. The ESD protection circuit of claim 1, wherein the control circuit detects if the level of the supply voltage is greater than a threshold value to generate the control signal; and if the level of the supply voltage is greater than the threshold value, the control circuit generates the control signal to enable the first transistor.

10. The ESD protection circuit of claim 9, wherein the control circuit comprises:
    a resistor, coupled between the supply voltage and a node;
    a capacitor, coupled between the node and the ground voltage; and
    an inverter, wherein the inverter is powered by the supply voltage, and the node is used as an input terminal of the inverter, and an output terminal of the inverter is used to generate the control signal.

* * * * *